United States Patent [19]

Yan

[11] Patent Number: 4,859,491

[45] Date of Patent: Aug. 22, 1989

[54] PROCESS FOR REPAIRING A CRYOGENIC HEAT EXCHANGER

[75] Inventor: Tsoung Y. Yan, Philadelphia, Pa.

[73] Assignee: Mobil Oil Corporation, New York, N.Y.

[21] Appl. No.: 107,748

[22] Filed: Oct. 13, 1987

[51] Int. Cl.[4] ............................................... B32B 35/00

[52] U.S. Cl. ...................................... 427/140; 156/94; 156/98; 427/142; 427/385.5; 427/388.1; 427/421; 427/429

[58] Field of Search ............... 427/140, 142, 299, 327, 427/385.5, 388.4, 377, 388.1, 421, 429, 407.1, 409, 388.5; 156/94, 98

[56] References Cited

U.S. PATENT DOCUMENTS

| | | | |
|---|---|---|---|
| 3,193,987 | 7/1965 | Manes et al. | 55/72 |
| 3,556,831 | 1/1971 | Schinabeck et al. | 427/142 |
| 3,593,535 | 7/1971 | Gaumer Jr. et al. | 62/40 |
| 3,608,000 | 9/1971 | Anderson | 427/142 |
| 3,711,310 | 1/1973 | Leeper | 427/142 |
| 3,803,803 | 4/1974 | Raduly et al. | 55/72 |
| 3,947,610 | 3/1976 | Bodmer et al. | 427/142 |
| 4,101,631 | 7/1978 | Ambrosini et al. | 423/210 |
| 4,251,572 | 2/1981 | Herliczek et al. | 427/142 |
| 4,419,163 | 12/1983 | Yamamoto et al. | 427/142 |
| 4,474,896 | 10/1984 | Chao | 502/216 |
| 4,491,609 | 1/1985 | Degel et al. | 427/215 |
| 4,500,327 | 2/1985 | Nishino et al. | 55/72 |
| 4,701,212 | 10/1987 | Yan et al. | 75/26 |
| 4,709,118 | 11/1987 | Yan et al. | 585/820 |

FOREIGN PATENT DOCUMENTS

| | | | |
|---|---|---|---|
| 1291435 | 3/1969 | Fed. Rep. of Germany | 427/142 |
| 52-48823 | 4/1977 | Japan | 427/142 |

OTHER PUBLICATIONS

Permabond, Technical Data Sheet, Permabond 101, 102, 105, Ref. No. 010583.

Permabond, Technical Data Sheet, Permabond QFS, Ref. No. 011086.

Loctite Corporation, Product Data Sheet, Threadlocking Adhesive/Sealants, 271, 277, 290, Aug. 1985.

Geist, et al. "Predicted and Actual Temperature Profiles and Pressure Drops in Large Coil Wound, Mixed Refrigerant Heat Exchangers," LNG-6, Session II, Paper 4, Apr. 7-10, 1980, Kyoto, Japan.

*Primary Examiner*—Sadie Childs

*Attorney, Agent, or Firm*—Alexander J. McKillop; Charles J. Speciale

[57] ABSTRACT

A low temperature process for repairing leakage-causing defects such as cracks, fissures, etc., in a cryogenic heat exchanger used in the liquefaction of a gas such as natural gas, especially one constructed from aluminum, involves the use of a low temperature, quick-curing filler composition to at least temporarily fill the defects and prevent further leakage. Thereafter, a sealant and, optionally, a metal patch is applied to and held in place against the sealant-treated damaged site employing a relatively slow-curing adhesive composition which exhibits good long-term sealing, and bonding performance if a patch is used, at cryogenic temperatures.

19 Claims, 1 Drawing Sheet

PROCESS FOR REPAIRING A CRYOGENIC HEAT EXCHANGER

BACKGROUND OF THE INVENTION

This invention relates to repairing cryogenic heat exchangers, especially those fabricated from aluminum. Such heat exchangers are conventionally employed in the liquefaction of natural gas and/or manufactured gases including those derived from petroleum.

In the various kinds of known natural gas liquefaction systems, aluminum is often the material of choice for the construction of the cryogenic heat exchanger routinely employed in the systems due to the high thermal conductivity, excellent low temperature properties, machinability and relatively low cost of this metal. However, aluminum is susceptible to corrosion by mercury which is ordinarily present in natural gas, e.g., from as low as about 0.005 to as high as about 220 micrograms per normal cubic meter (i.e., from about $5.5\times10^{-3}$ to about 220 parts per billion by volume). Concentrations of mercury greater than about 0.01 micrograms per normal cubic meter are generally regarded as undesirable especially where aluminum cryogenic liquefaction equipment is concerned due to mercury's capability for forming a corrosive amalgam with aluminum. Even with the demercuration of natural gas prior to its introduction to the liquefaction equipment (see, for example, the demercuration processes described in U.S. Pat. Nos. 3,193,987; 3,803,803; 4,101,631; 4,474,896; 4,491,609; 4,474,896; and 4,500,327), a sufficient amount of elemental mercury will often remain in the post-treated gas as to pose a significant safety and maintenance problem where aluminum cryogenic heat exchangers are concerned.

Although of particular concern where aluminum cryogenic heat exchangers are involved, the safety and maintenance problems attributable to corrosive failure and/or stress corrosion cracking are common to cryogenic equipment fabricated from other materials, e.g., stainless steel, as well.

A variety of techniques for repairing damaged hollow articles such as containers, conduits, closed cooling systems, and the like, are known.

According to the method for sealing leaks in pipes and other rigid, hollow articles described in U.S. Pat. No. 3,556,831 to Schinabeck, et al., two epoxy resin compositions containing different curing agents are successively applied to the leakage site with the subsequently applied epoxy resin curing more slowly than the initially applied epoxy resin. The Schinabeck, et al. disclosure makes no provision for very low temperature application nor does it provide combination filling and sealing corrective procedure.

U.S. Pat. No. 3,608,000 describes a method for sealing leaks in pipes, conduits, gas-lines, closed containers, tanks, and so forth, in which the interior of such equipment is first purged of any moisture and/or oxygen which may be present followed by pressurized introduction of a sealant composition in an inert gas. The sealant composition escapes from any leaks present in the equipment into the outer ambient environment where it reacts with oxygen and/or moisture at the leakage site to form a solid reaction product. The sealant comprises (1) a volatile metal alkyl compound and (2) a volatile organosilane compound, e.g., a mixture of 20 volume percent diethyl zinc and 80 volume percent tetraethoxysilane in nitrogen.

U.S. Pat. No. 3,645,816 describes a method and apparatus for effecting the repair of fluid leaks such as those generally found around fasteners employed in the construction of rigid hollow articles such as aircraft integral fuel tanks. Repair of the leaks is accomplished by placing a preformed metallic foil patch having the same configuration as the protruding portion of the fastener and coated with a polysulfide sealant or other type of rapid cure sealants over the fastener. The sealant is then cured, preferably by application of heat to the localized area employing a heating tool having interchangeable tips for mating engagement with the particular preformed foil patch.

Damaged articles formed of aluminum or magnesium, including the alloys thereof, are repaired in accordance with the process of U.S. Pat. No. 3,711,310 by suitably preparing the damaged area as, for example, by grinding away the fault, then refilling the prepared area utilizing a plasma spray repair coating comprising aluminum or an aluminum-silicon alloy with a mixture of 10–40 weight percent molybdenum and, finally, refinishing to dimension as and if required.

As disclosed in U.S. Pat. No. 3,947,610, leaks in closed cooling systems containing an aqueous medium as the coolant are sealed by electroless deposition of a metal or metal containing compound from a water soluble, easily reducible metal compound. A complexing agent may be added to the coolant to assist in solubilizing the easily reducible metal compound. In one embodiment, the reducible metal compound is formed in situ by attacking the conduit walls of the cooling systems so as to form solubilized compounds, or compounds which can be solubilized by addition of suitable complexing agents.

U.S. Pat. No. 4,371,569 describes a method and apparatus for reinforcing and repairing piping in which a film is applied to the interior of the pipe. The film can be formed from a two-liquid synthetic resin paint which comprises a principal paint liquid and a solidifier liquid, a solid forming upon mixture of the two components.

U.S. Pat. No. 4,419,163 describes a one step method of applying a sealant to the inside surface of a pipe, such as a gas pipe, to repair any portions likely to cause a leak. The sealant is applied, then dried and finally solidified to seal the leakage sites. An injection means is provided for supplying the sealant in a cylindrical shape so that every portion of the inner surface of the pipe will be coated.

It is an object of the present invention to provide a process for repairing a cryogenic heat exchanger, especially one fabricated from aluminum, employed in the liquefaction of a gas such as natural gas.

It is a particular object of the invention to effect the repair of a cryogenic heat exchanger at low temperature, e.g., at or about the service temperatures which are typical of such equipment.

It is yet another object of the invention to provide a process for repairing a cryogenic heat exchanger working from an exterior surface, thereby facilitating both the repair operation and minimizing down time.

SUMMARY OF THE INVENTION

In accordance with the present invention, a method for repairing leakage-causing defects in a cryogenic heat exchanger is provided which comprises:

(a) reducing the interior pressure of the heat exchanger to a level which does not exceed the external pressure upon the heat exchanger while maintaining the temperature of the heat exchanger at a low level relative to the ambient external temperature;

(b) applying a curable liquid filler composition to the surface of the heat exchanger at the leakage site, said composition having a consistency and viscosity which causes seepage into cracks by force of capillary action and, upon a relatively short period of cure at low temperature, forming a solid material which fills the leakage-causing cracks;

(c) curing the curable liquid filler composition; and (d) applying a sealant composition to the surface of the heat exchanger at the filled leakage site, the sealant capable of withstanding extremely low temperature environment without deterioration, and, optionally, a patch can be adhered to the site with the sealant or an additional adhesive composition which also exhibits effective long-term adhesive performance under cryogenic conditions.

Following the foregoing procedure, a process which from start to finish often requires no more than about 50 hours overall and in a specific repair situation can even take as little as 10 hours to complete, the heat exchanger can be repressurized and returned to normal service Although the repair process of this invention is applicable to cryogenic heat exchangers fabricated from any appropriate material, its advantages are particularly evident where aluminum is concerned. In liquefied natural gas (LNG) cryogenic apparatus constructed from aluminum, the aforementioned corrosive capability of mercury tends to manifest itself as leakage-causing cracks in the vicinity of the welds. Thermal welding is an inappropriate method for repairing the damaged sites as the application of heat only causes the development of new cracks and/or the worsening of those cracks already present.

The ease and rapidity with which the repair process of this invention is carried out, a principal benefit of which is significantly reduced down time in cryogenic plant operation, is due in part to the widely varying cure characteristics and physical properties of the leakage filler composition, such as viscosity, consistency, and surface attraction forces which cause seepage by means of capillary action, and the cryogenic adhesive composition utilized in the process. Thus, the filler composition will undergo a rapid cure at low temperature to provide a solid material which fills the cracks present at the damaged site and prepares the site for application of the sealant and, optionally, the patch. While the cured filler composition may soon become brittle and as such offers only short-term leak stoppage capability, the adhesive sealant composition employed in sealing the cracks, although requiring a comparatively lengthy cure to achieve full adhesive strength, once cured retains excellent long-term sealing and adhesive properties under cryogenic conditions, i.e., at natural gas liquefaction temperatures (−200° C. and below).

DESCRIPTION OF THE PREFERRED EMBODIMENTS

In a preliminary operation, the pressure within the cryogenic heat exchanger which is to undergo repair is reduced to a level not exceeding the external pressure. Generally, this requires reducing the internal pressure to local atmospheric pressure. The purpose of this operation is to permit liquid filler composition, once applied, to thoroughly infiltrate and fill all the cracks at the leakage site. During this and all subsequent operations, the heat exchanger is maintained at a low temperature relative to the ambient external temperature. Preferably, this temperature is at or about the normal operational temperature of the heat exchanger, e.g., from about −20° F. to about −200° F. and even cooler. Performing the repair of the leakage site(s) under such cryogenic conditions is necessary in order to minimize down time of the heat exchange unit.

Figure 1:
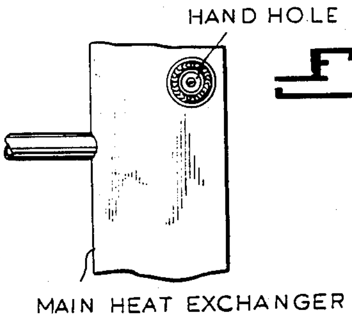
FIG. 1 is a portion of a main heat exchanger such as those used in a cryogenic process for producing liquefied natural gas.
Figure 2:
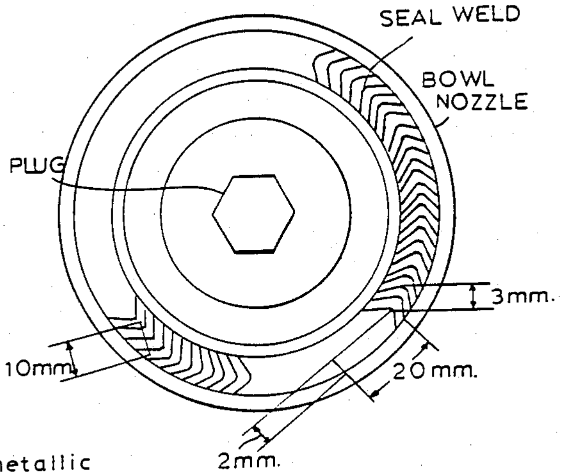
FIG. 2 is an enlarged side elevational view of the hand hole shown in FIG. 1.

For example, FIG. 1 depicts a portion of a primary cryogenic heat exchanger vessel with an influent feed pipe and a hand hole provide for ingress into and egress from the vessel for installation and/or maintenance. The hand hole is more clearly seen in FIG. 2 wherein the installation with the seal weld is clearly shown. Cracks ordinarily occur at the seal weld both internally and externally, and it is a primary zone of repair in heat exchangers. One method of repair includes welding which requires additional heat and, necessarily, more down time. Thus, the present invention is ideally suited to repair vessel installations such as shown herein.

Following internal pressure reduction, the leakage site is ready to be repaired. Ordinarily, it is preferred to prepare, or pre-treat, the damaged site, e.g., by removing all dirt, grease, etc., by any suitable means, e.g., by application of detergent, solvent, sand blasting or other abrasive technique, etc., or combination of such procedures. This optional pre-treatment operation may also include polishing and/or finishing the damaged site to further enhance the penetration of the subsequently applied curable liquid leakage sealant composition into the cracks, fissures and/or other surface discontinuities responsible for or contributing to leakage.

In one embodiment of the repair process, the step of applying the leakage sealant can be carried out in two operations. At first, a liquid primer, essentially a solvent solution of a low temperature curing agent, is applied to the damaged site and after a suitable interval, say one to ten minutes during which the primer is allowed to penetrate the cracks, excess primer is wiped away or otherwise removed from the site. Thereafter, a liquid component capable of undergoing rapid low temperature cure in the presence of the aforesaid curing agent is applied to the leakage site employing any suitable means, e.g., brushing, spraying, etc. Upon contact with the primer, the curable component quickly cures to a solid material which provides effective, although short term, leak sealing capability.

Figure 3:
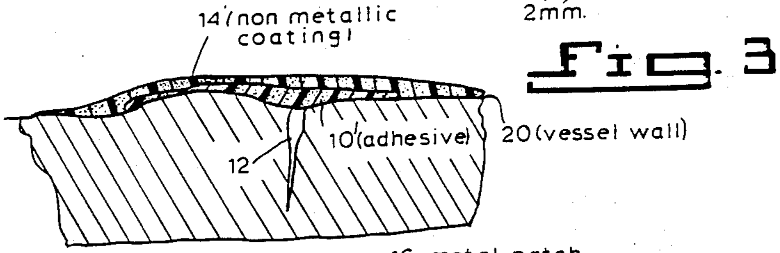
FIG. 3 is a side elevational view of a surface fissure with a sealing attempted without the benefit of the present invention.
Figure 4:
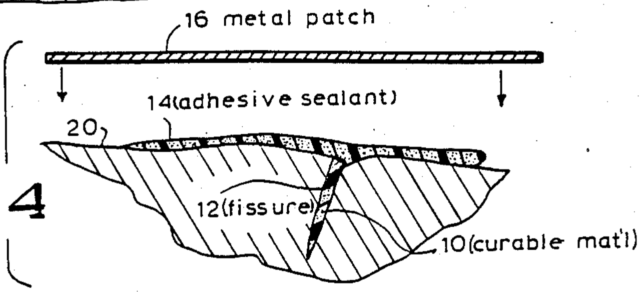
FIG. 4 depicts a side elevational view of a surface fissure corrected in accordance with the present invention.

Referring to FIG. 4 it can be seen that the first application of curable material 10 be capable of forcing itself such as, for example, by way of seepage under capillary action, into fissures 12 created by the deterioration of the vessel wall 20. This characteristic is particularly important in the case of welded areas since the surface can have an irregular configuration which does not lend itself to seepage. Thus, in FIG. 3 a typical adhesive composition 10' is shown applied to cryogenic vessel wall 20 at a temperature of around −20° C. The composition does not even penetrate the fissure 12 as does the filler component 10 of the present invention Moreover, the sealant adhesive 14 shown in FIG. 4 provides long term protective covering over the filled fissure 12 so that leakage is cured and further degradation is prevented. In the case of the embodiment shown in FIG. 3, the long term protective coating 14' merely overlies the first non-invasive coating 10'. This former condition is, of course, less desirable since it does not provide a healing fill for the fissure 12. Finally, a patch 16, which can preferably be of metallic material, can be placed over the adhesive sealant 14 to provide a further protective coating. Inasmuch as the filler 10 has already healed the fissure 12, the patch 16 is merely an optional addition which enhances the corrective action, but is not always necessary.

Among the suitable leakage filler compositions are the acrylates, in particular the vinylidene acrylates,

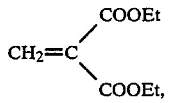

and the cyano acrylates,

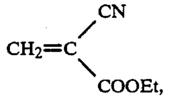

both of which are rapidly cured at low temperature when contacted with a suitable primer. A commercially available primer which provides good results is "Permabond QFS" (Permabond Division of National Starch & Chemical Corp.), a cure initiator in a 1, 1, 1-trichloroethane solvent base for accelerating the cure of a cyanoacrylate adhesive, which cleans the surface as it penetrates the cracks. Curable sealants include "Permabond 101" (Permabond Division of National Starch & Chemical Corp.), a cyanoacrylate adhesive having a viscosity of 2–5 cps at 25° C., and "Loctite 290" (Loctite Corp.), a methacrylate ester.

Following application and curing of the leakage filler, the damaged site is optionally cleaned as before in preparation for application of the adhesive which seals fissures found therein and/or adheres a patch to the site to complete the repair process. In a preferred sealing operation, metal primer in the form of a solvent solution of curing agent, e.g., "Essex metal primer 42024" of Essex Chemical Corp., is applied to the leakage-filled site and the surface of the patch material, if a patch is used for bonding to the site. An adhesive which undergoes curing in the presence of the curing agent to provide an effective long-term bonding agent under cryogenic conditions, e.g., a polyurethane, nylon-epoxy, or filled epoxy, in particular, a high-viscosity urethane sealant such as Sealant "553.02" of Essex Chemical Corp., is applied to the damaged site and/or the primer-coated surface of the metal patch. Thereafter, the metal patch can be applied if desired to the damaged site, treated side down, and maintained in place against the damaged site, preferably under pressure. Preferably, the patch will be fabricated from a metal which will correspond to the metal (or metal alloy) of the heat exchanger. Thus, in the case of an aluminum heat exchanger the patch, too, will be constructed of aluminum. Patches provided as multiple layered metal foils are also contemplated.

It is generally preferred that from the completion of the first operation in the repair process, namely, from the time the pressure within the heat exchanger has been reduced to at least the external pressure, to the application of the sealant and metal patch, if used, the atmosphere in the immediate vicinity of the damaged site be maintained in a substantially dry condition. This can be readily and simply achieved by directing a continuous low pressure current of dry, chemically inert gas, e.g., nitrogen, against the site undergoing repair. Within a half-hour to an hour following application of the sealant or metal patch to the damaged site, it is no longer desirable to maintain such dry conditions; on the contrary, it is at this point in time advantageous to expose the site to humidity or water to accelerate the curing of the adhesive.

Even before the sealant/adhesive has reached its maximum bond strength (up to 100 hours or so), for example, after a total repair period of from about 10 to about 50 hours, the cryogenic heat exchanger can be repressurized with gas and full, normal operation can be resumed.

The following example is illustrative of the repair process of this invention.

EXAMPLE

A heat exchanger such as that shown in FIG. 1 is relieved of the pressure while maintaining substantially the same temperature as in operation, such as between −20° C. to about −200° C. The leaking area is cleaned, polished and finished with a fine sanding cloth. A first step primer solution such as "Permabond QFS" from the Permabond Corporation of National Starch is applied to the surface area adjacent any cracks or fissures in the surface of the heat exchanger. This solution cleans the surface and also seeps into the crack by virtue of its low viscosity and characteristic ability to be drawn into the opening by force of capillary action. After about 1 to 10 minutes excess solution is wiped off. The rapid curing adhesive at low temperature is applied to the crack area by brushing or spraying. It has been found that the useful adhesives for this application are vinylidene acrylates,

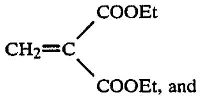

cyano acrylates,

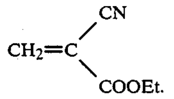

Useful commercial brands have been found to be "Permabond 101" or "Loctite 290". After from about 1 to about 30 minutes of curing time the area to be repaired is ready for the second step. At this point, the fissures or cracks have been substantially filled with the first quick curing material.

Once again, the surface is cleaned with acetone. The second step primer, such as "Essex 42024" is applied to the area to be sealed. If a patch material, such as an aluminum backed patch is to be used, the aluminum backing should also be cleaned with the acetone and the primer material applied thereto for a period of 10 to 20 minutes. Next, the second step adhesive is applied evenly to the area to be sealed. Such adhesives include polyurethane, nylon-epoxy, and filled epoxy, etc. It has been found that the commercial brand "Essex 553.02" is especially effective as a sealant/adhesive. In the event that a patch such as the one having an aluminum backing is used, the second step adhesive should also be applied thereto. It should be noted that during each of these steps the area to be repaired should be subjected to a dry atmosphere which can be achieved by blowing the working area with moisture-free nitrogen gas. If a patch is to be applied, the adhesive should be applied to the area with a constant pressure. After only about one half hour to about 1 hour, moisture-containing air or water is sprayed on the area to accelerate the curing. Surprisingly, the unit can be pressurized and put back on stream again in a time period of from only about 10 to about 50 hours, thereby substantially minimizing any down time experienced as a result of the repair.

As previously indicated, the first adhesive is rapidly cured at low temperature and develops strength in about only 10 minutes to fill fissures and cracks and stop the leaking. Usually, this adhesive becomes brittle at very low temperature and tends to have poor long term performance. This feature is not detrimental, since the material has already filled the narrow fissure opening and the relative strength of the adhesive found therein is unimportant More importantly, however, is the strength of the second adhesive which, although it cures more slowly than the first adhesive (e.g., from 50 in about 100 hrs.), has very good long term cryogenic performance. As a result, the present invention has been able to take advantage of the complementary natures on the two types of adhesives which lead to a new and effective technique for repairing cryogenic vessels. Furthermore, the technique can be applied to both the inner surface of the vessel as well as the outer surface of the vessel to provide an effective repair. Not only is this technique economical and rapid, it is also very safe and lends itself quite readily to field application.

Thus, while there have been described what are presently believed to be the preferred embodiments of the present invention, those skilled in the art will realize that other and further modifications can be made without departing from the spirit of the invention, and it is intended to claim all such changes and modifications as come within the true scope of the invention.

What is claimed is:

1. A method for repairing leakage-causing cracks and fissures in a cryogenic heat exchanger is provided which comprises:

(a) reducing the interior pressure of the heat exchanger to a level which does not exceed the external pressure upon the heat exchanger while maintaining the temperature of the heat exchanger at a low level relative to the ambient external temperature;

(b) applying a curable liquid filler composition to the surface of the heat exchanger proximal the leakage site for seepage into said cracks and fissures located at said leakage, said composition upon a relatively short period of cure at low temperature forming a solid material which fills said cracks and fissures;

(c) curing said filler composition; and, (d) applying a sealant composition to the surface of said heat exchanger at the filled leakage site, said sealant composition having long-term sealing performance under cryogenic conditions.

2. The method of claim 1 wherein said sealant composition has effective long-term adhesive characteristic under cryogenic conditions, and which method further comprises applying a patch to said leakage site for adherence thereto with said sealant composition.

3. The method of claim 2 wherein said patch is metallic.

4. The method of claim 1 wherein the cryogenic heat exchanger is fabricated from aluminum.

5. The method of claim 1 wherein in step (a), the pressure within and outside the heat exchanger are substantially equal and the temperature of the heat exchanger is maintained within the cryogenic range.

6. The method of claim 5 wherein the temperature is from about −20° C. to about −200° C.

7. The method of claim 1 wherein the surface of the damaged site is cleaned prior to carrying out step (b).

8. The method of claim 1 wherein the surface of the damaged side is cleaned prior to carrying out step (d).

9. The method of claim 1 wherein said filler composition comprises an acrylate in combination with a curing agent.

10. The method of claim 9 wherein the acrylate is a vinylidene acrylate or cyano acrylate.

11. The method of claim 1 wherein said sealant comprises a polyurethane, nylon-epoxy or filled epoxy in combination with a curing agent.

12. The method of claim 3 wherein the metal of the patch corresponds to the metal of the heat exchanger

13. The method of claim 3 wherein the metallic patch is fabricated from aluminum.

14. The method of claim 1 wherein steps (b), (c) and (d) are carried out under dry conditions.

15. The method of claim 2 wherein following step (d), the patched site is contacted with a humid atmosphere or water to accelerate curing of said sealant.

16. The method of claim 1 including the steps of applying a liquid primer including a curing agent to the leakage site and allowing said liquid primer to penetrate said cracks and fissures prior to applying said filler composition.

17. The method of claim 16 wherein said filler composition is applied by brushing.

18. The method of claim 16 wherein said filler composition is applied by spraying.

19. The method of claim 1 wherein said sealant composition is a curable adhesive which cures more slowly than said filler composition.

* * * * *